(12) United States Patent
Kimura et al.

(10) Patent No.: US 7,602,565 B2
(45) Date of Patent: Oct. 13, 2009

(54) OPTICAL PICKUP

(75) Inventors: Katsuhiko Kimura, Kasumigaura (JP); Junichi Senga, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 0 days.

(21) Appl. No.: 11/528,345

(22) Filed: Sep. 28, 2006

(65) Prior Publication Data

US 2007/0177283 A1  Aug. 2, 2007

(30) Foreign Application Priority Data

Jan. 31, 2006 (JP) .............................. 2006-022191

(51) Int. Cl.
*G02B 7/02* (2006.01)
(52) U.S. Cl. .................. 359/824; 359/819; 359/823
(58) Field of Classification Search ......... 359/821–824, 359/819, 813, 811
See application file for complete search history.

(56) References Cited

U.S. PATENT DOCUMENTS 4,736,122 A * 4/1988 Opie et al. .................. 307/419

FOREIGN PATENT DOCUMENTS

| JP | 10-334486 | * 5/1997 |
|---|---|---|
| JP | 10-334486 | 12/1998 |

\* cited by examiner

*Primary Examiner*—Ricky L Mack
*Assistant Examiner*—Brandi N Thomas
(74) *Attorney, Agent, or Firm*—Antonelli, Terry, Stout & Kraus, LLP.

(57) ABSTRACT

In an objective lens driving means of an optical pickup, the accuracy of the boundary position of magnets is improved, the generation of angular moment through coils is suppressed, and the inclination of the objective lens is reduced. An optical pickup for reading or writing information on an optical disc using an objective lens includes a lens holder for holding an objective lens, three magnets disposed facing to each of the two sides of the lens holder that are parallel to the focusing direction and the tracking direction, and a yoke for mounting these magnets. The yoke includes a central yoke surface for mounting the central one of the three magnets, and outer yoke surfaces for mounting the outer two of the three magnets. A step is formed between the central yoke surface and each of the outer yoke surfaces.

2 Claims, 7 Drawing Sheets

OPTICAL PICKUP

BACKGROUND OF THE INVENTION

1. Field of the Invention

The present invention relates to an optical pickup provided in optical disc drives for reading information recorded on a recording surface of an optical disc or for recording information thereon.

2. Background Art

Conventional objective lens driving means provided in the optical pickup of an optical disc drive is composed of a moving part on which an objective lens is mounted, support members for supporting the moving part, focusing coils, tracking coils, a yoke, and magnets.

When a drive current is applied to the focusing coils, electromagnetic force is produced by the interaction of the current with the magnetic flux produced by the magnets. The electromagnetic force drives the moving part in a focusing direction, which is either toward or away from the optical disc surface. Similarly, when a drive current is applied to the tracking coils, electromagnetic force is produced by the interaction of the current with the magnetic flux from the magnets. The electromagnetic force drives the moving part in a tracking direction, which is along the radius of the optical disc.

An example of a conventional optical pickup having the aforementioned configuration is disclosed in Patent Document 1. In the optical pickup disclosed in Patent Document 1, the tracking coils and the focusing coils are fixedly attached to a lens holder. A single magnet is magnetized with three pairs of an N pole and an S pole alternately. The publication also discloses a configuration in which three magnets are combined.

Patent Document 1: JP Patent Publication (Kokai) No. 10-334486 A 1998 (page 4, and FIGS. 1 and 2)

SUMMARY OF THE INVENTION

When a magnet magnetized with N poles and S poles alternately as disclosed in Patent Document 1 is used, it is important that the boundaries of the magnetic poles are located at predetermined reference positions. If the boundaries of the magnetic poles are displaced from the reference positions, the magnetic flux density distribution with respect to the focusing coils or the tracking coils would vary, and, as a result, the distribution of driving force generated in the focusing coils or the tracking coils would become asymmetrical with respect to the center of each coil. Such asymmetrical driving force distribution with respect to the center of each coil would generate angular moment(torque), which would cause the objective lens to be inclined. If the objective lens is inclined, the focusing spot will be blurred due to optical aberrations, thereby possibly preventing accurate writing or reading.

However, in the optical pickup according to Patent Document 1, when the single magnet is divided into three magnetic pole regions, the magnetic pole boundaries are visually indistinguishable, and so the external shape of the magnet is the only reference for positioning purposes. Given manufacturing errors, however, the magnetic pole boundaries may not be necessarily positioned uniformly with respect to the outer shape of the magnet. Thus, there is the problem that the magnetic pole boundary positions are displaced from reference positions.

In the optical pickup of Patent Document 1, the use of three magnets is also problematic in that the magnet boundaries may be displaced from their reference positions if there is a dimensional error in any of the magnets.

It is therefore an object of the invention to provide an optical pickup of the type in which different magnetic poles are adjacently disposed, wherein the accuracy of magnet boundary positions is improved, the angular moment generated through the coils is reduced, and the inclination of the objective lens is minimized.

In order to achieve the aforementioned object, the invention provides an optical pickup for reading and writing information on an optical disc using an objective lens, comprising: a lens holder for holding an objective lens; three magnets disposed facing to each of the two sides of the lens holder that are parallel to a focusing direction and a tracking direction; and a yoke for mounting the magnets, wherein the yoke includes, for each of the two sides of the lens holder, a central yoke surface for mounting a central one of the three magnets and outer yoke surfaces for mounting the two outer magnets of the three magnets, wherein a step is formed between the center yoke surface and each of the outer yoke surfaces.

Each of the outer magnets is abutted against the step of the yoke.

The width of the central magnet in the tracking direction is equal to or smaller than the width of the central yoke surface of the yoke in the tracking direction. The central magnets are abutted against their respective outer magnets disposed on a diagonal with the objective lens in the center of their outer magnets.

The thickness of the central magnet is smaller than the thickness of the outer magnets. The surfaces of the three magnets opposite the side of the lens holder parallel to the focusing direction and the tracking direction lie substantially in the same plane.

In accordance with the invention, in an optical pickup configured such that a plurality of magnets are disposed adjacent to one another, the accuracy of the magnet boundary positions can be improved even when there is dimensional error in any of the magnets. As a result, the magnetic flux density distribution can be maintained symmetrical, and the generation of angular moment that would tilt the objective lens can be suppressed. Thus, information can be read or written on an optical disc accurately.

Furthermore, because the distance between each magnet and each coil can be made uniform, the drive force produced by each of the coils can be increased, so that the writing or reading of information on the optical disc can be performed at high speeds.

DESCRIPTION OF THE PREFERRED EMBODIMENTS

Embodiment 1

An embodiment of the optical pickup according to the invention will be described with reference to the drawings. Initially, an optical disc drive 100 in which an optical pickup 110 is mounted is described with reference to a block diagram of FIG. 7. The optical disc drive 100 includes a spindle motor 120 for rotating an optical disc 101, an optical pickup 110 for reading or writing information on the optical disc 101, and a controller 130 for controlling these components. The optical pickup 110 includes an objective lens driving means 50, of which the details will be described later, and optical components such as a laser light emitting device 111.

Figure 7:
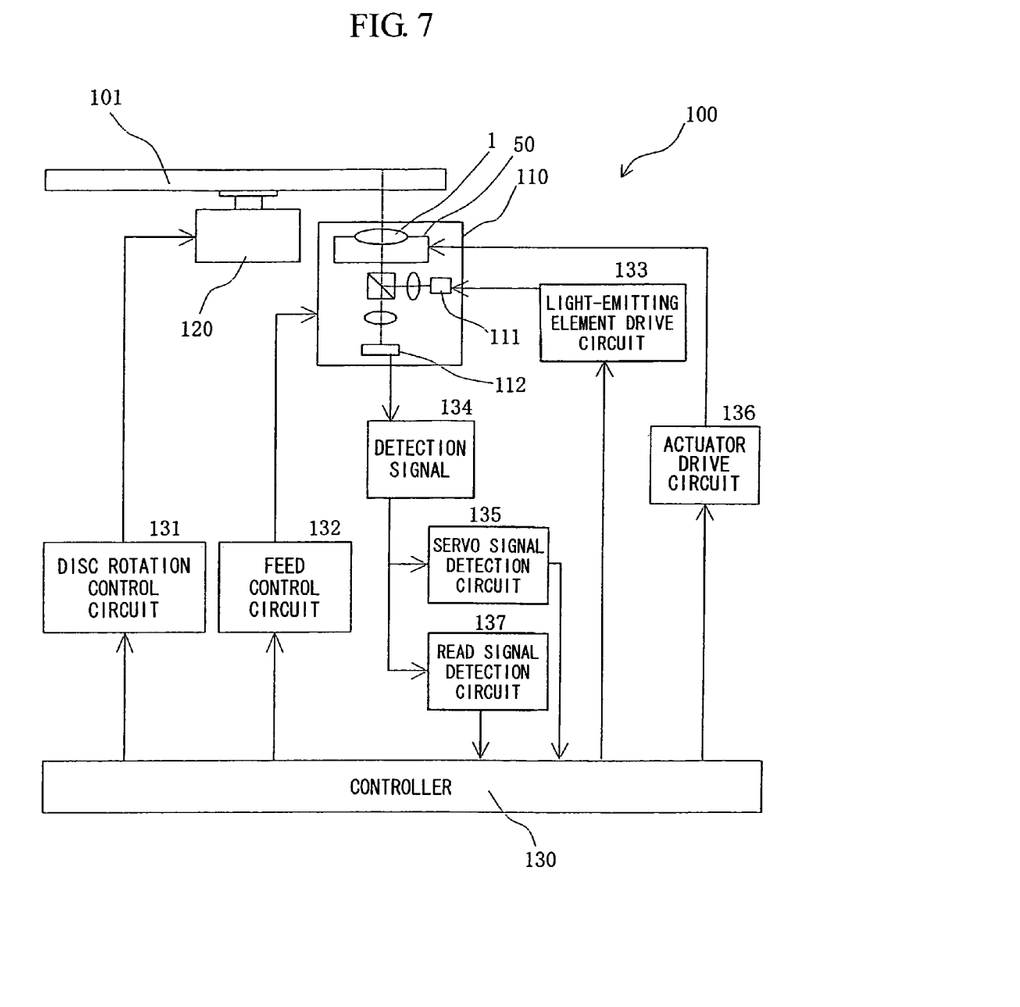
FIG. 7 shows a block diagram of an optical disc drive according to the present invention.

A disc rotation control circuit 131, which is connected to the controller 130, receives an instruction therefrom and drives the spindle motor 120 on which the optical disc 101 is mounted. A feed control circuit 132, which is also connected to the controller 130, receives an instruction therefrom and causes the optical pickup 110 to be moved along the radius of the optical disc 101.

To the laser light emitting device 111 mounted on the optical pickup 110, a light-emitting device driving circuit 133 is connected. Upon instruction from the controller 130, the light-emitting device driving circuit 133 sends a drive signal to the laser light emitting device 111, which then emits laser light. The laser light is focused by the objective lens 1 on the optical disc 101. The thus focused laser light is reflected by the optical disc 101. The reflected light passes through the objective lens 1 and then becomes incident on a photodetector 112, which produces a detection signal 134. The detection signal 134 is sent to a servo signal detection circuit 135 and a read signal detection circuit 137. Based on the detection signal 134 sent to the servo signal detection circuit 135, a servo signal is produced and fed to an actuator driving circuit 136.

The actuator driving circuit 136 feeds a drive signal to an objective lens driving means 50 of the optical pickup so as to control the positioning of the objective lens 1.

On the other hand, based on the detection signal 134 fed to the read signal detection circuit 137, a read signal is produced, with which the information recorded in the optical disc 101 can be reproduced.

In the following, the details of the objective lens driving means 50 provided in the optical pickup 110 shown in FIG. 7 will be described.

Figure 1:
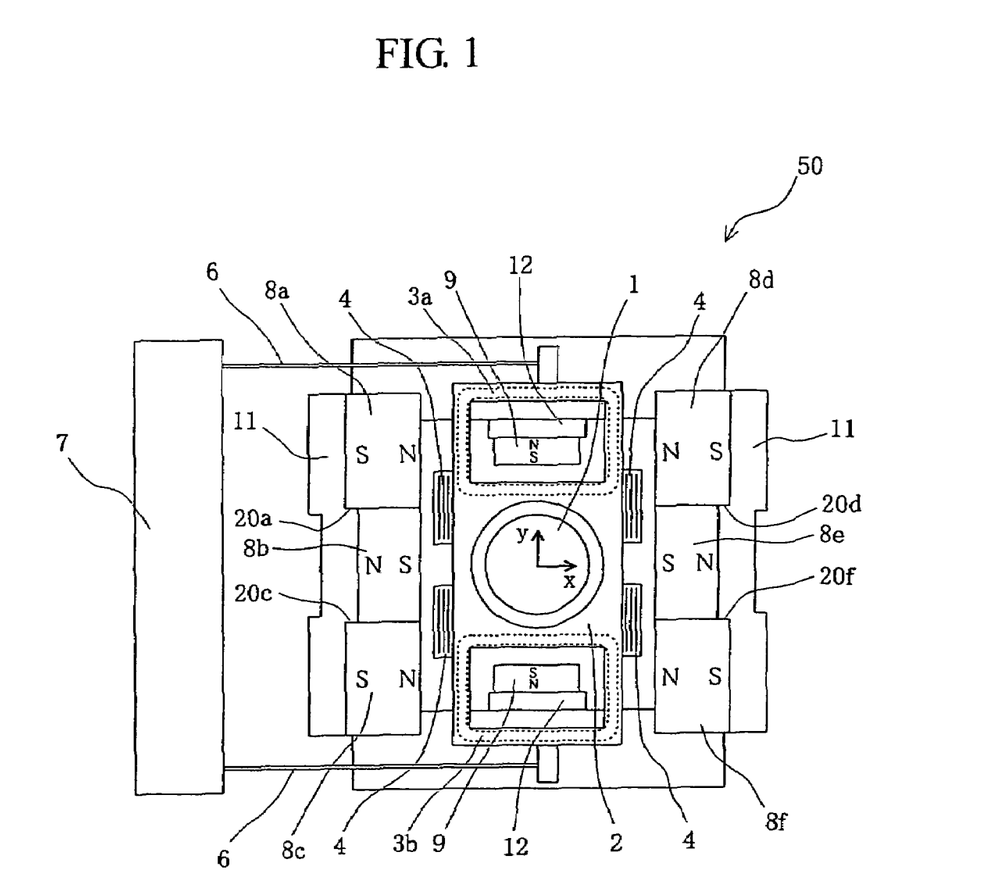
FIG. 1 shows an embodiment of an objective lens driving means of an optical pickup according to the invention.

FIG. 1 shows a top plan view of the objective lens driving means 50 in the optical pickup 110 according to the present invention. In the figure, a direction perpendicular to the sheet of drawings is the focusing direction, in which the objective lens 1 is moved toward or away from the optical disc surface along the optical axis of the objective lens 1. The y direction is the tracking direction in which the objective lens 1 is moved along the radius of the optical disc. A direction perpendicular to both the focusing direction and the tracking direction is an x-direction.

The objective lens 1 is mounted on a lens holder 2. A focusing coil 3 is composed of two coil portions 3a and 3b mounted apart from each other in the tracking direction, with the object lens 1 disposed in the center of them. Tracking coils 4 are mounted on the sides of the lens holder 2 that are parallel to the focusing direction and the tracking direction.

One end of each of the support members 6 is each fixed to the lens holder 2, while the other end thereof is fixed to the fixing portion 7. The focusing coil 3 and the tracking coils 4 are electrically connected to the one end of the support members 6 by soldering, for example.

The magnets 8a, 8b, 8c, 8d, 8e, and 8f are mounted on the yoke 11. Three of these magnets are disposed on one side of the lens holder 2 facing to the other three disposed on the other side thereof, the sides of the lens holder 2 being parallel to the focusing direction and the tracking direction.

The inner yokes 12 rise from the bottom of the yoke 11 and are each disposed inside the focusing coil 3a or 3b. Inner magnets 9 are each mounted on the side of the inner yoke 12 nearer to the objective lens 1.

Figure 2:
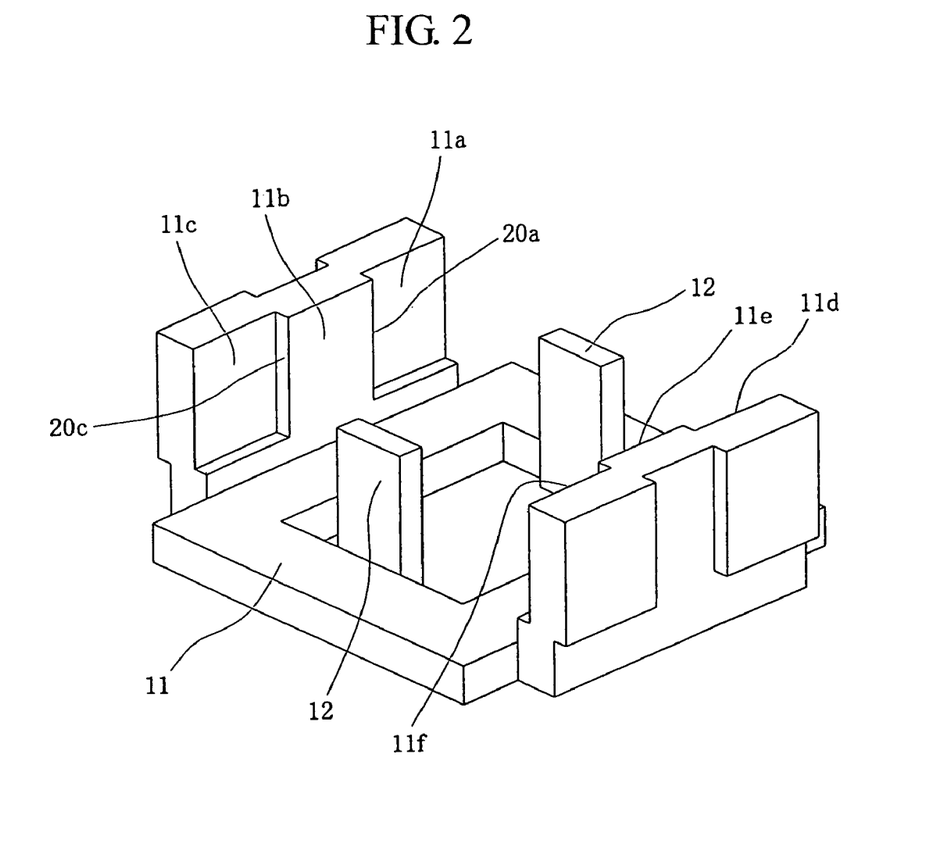
FIG. 2 shows a yoke of the objective lens driving means shown in FIG. 1.

FIG. 2 shows a perspective view of the yoke 11. The yoke 11 includes, with respect to either side of the lens holder 2, central yoke surfaces 11b and 11e for mounting magnets 8b and 8e, respectively, that are mounted at the center, and outer yoke surfaces 11a and 11c, and 11d and 11f for mounting magnets 8a and 8c, and 8d and 8f, respectively. Steps are formed between the central yoke surfaces and the outer yoke surfaces. Thus, the yoke 11 includes step surfaces 20a, 20c, 20d, and 20f between the central yoke surfaces 11b and 11e and the outer yoke surfaces 11a, 11c, 11d, and 11f.

Figure 3A:
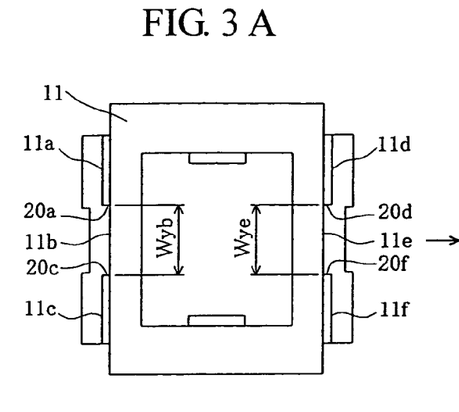
FIG. 3A, FIG. 3B, FIG. 3C and FIG. 3D show how the yoke and magnets of the objective lens driving means of FIG. 1 are assembled.
Figure 3B:
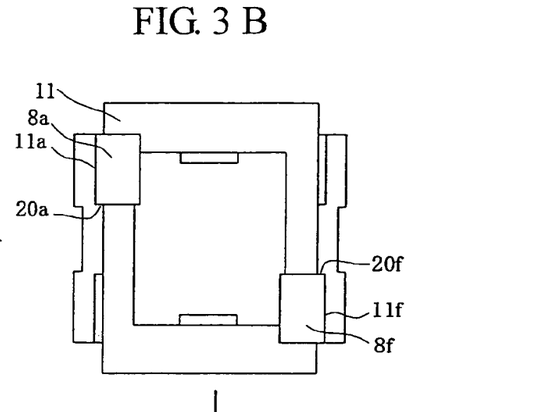
Figure 3C:
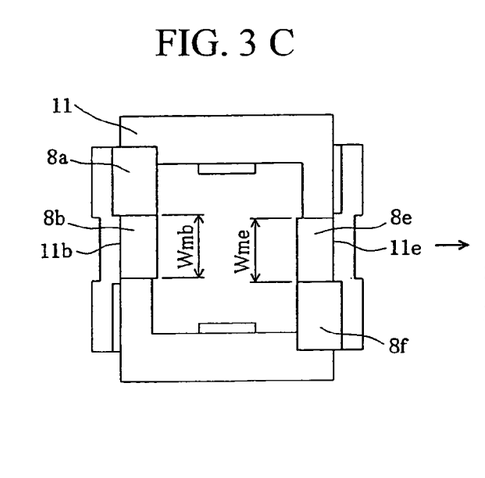
Figure 3D:
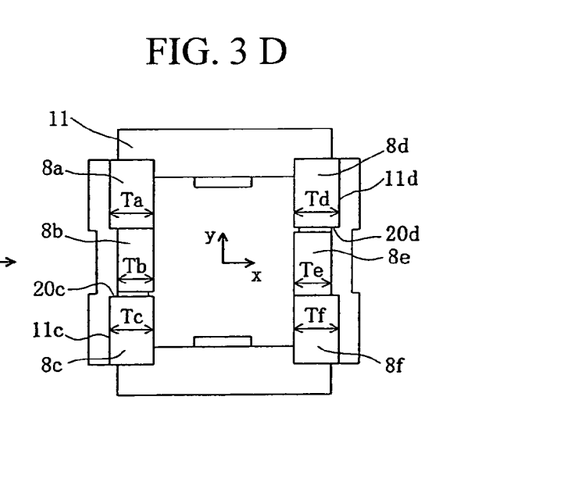

FIG. 3A, FIG. 3B, FIG. 3C and FIG. 3D show how the yoke 11 and the magnets 8a to 8f are assembled together. FIG. 3A shows the yoke 11. First, as shown in FIG. 3B, the outer magnets 8a and 8f to be disposed diagonally are mounted on the yoke surfaces 11a and 11f while they are abutted against the step surfaces 20a and 20f, respectively. Then, as shown in FIG. 3C, the central magnets 8b and 8e are mounted on the yoke surfaces 11b and 11e while they are abutted against the already attached magnets 8a and 8f, respectively. Thereafter, as shown in FIG. 3D, the outer magnets 8c and 8d, which are to be positioned on the remaining diagonal, are mounted on yoke surfaces 11c and 11d while they are abutted against the step surfaces 20c and 20d, respectively.

The widths Wmb and Wme of the central magnets 8b and 8e in the tracking direction are equal to or smaller than the widths Wyb and Wye of the central yoke surfaces 11b and 11e in the tracking direction. FIG. 3A, FIG. 3B, FIG. 3C and FIG. 3D show a case where the widths Wmb and Wme of the central magnets 8b and 8e in the tracking direction are smaller than the widths Wyb and Wye of the central yoke surfaces 11b and 11e in the tracking direction. By making the widths Wmb and Wme of the central magnets 8b and 8e in the tracking direction equal to or smaller than the widths Wyb and Wye of the central yoke surfaces 11b and 11e in the tracking direction, it becomes possible to cause the outer magnets 8c and 8d, which are mounted after the central magnets 8b and 8e, to become reliably abutted against the step surfaces 20c and 20d, respectively. In this case, gaps are formed between the central magnets 8b and 8e and the later-mounted outer magnets 8c and 8d, respectively, which are on a diagonal with respect to the objective lens 1.

The steps for the mounting of the magnets 8a to 8f on the yoke 11 can be easily formed by press working. Since the positions of the step surfaces 20a, 20c, 20d, and 20f are determined by the accuracy of their molds, the step surfaces can be positioned at predetermined reference positions with high accuracy. Because the magnets 8a, 8c, 8d, and 8f are abutted against the step surfaces 20a, 20c, 20d, and 20f that are aligned at the reference positions at high accuracy, the accuracy of each magnet boundary position can be improved. Thus, the variations in the magnetic flux density distribution can be reduced, and the drive force produced through the focusing coil 3 and the tracking coil 4 can be made uniform.

As a result, the generation of the angular moment that would cause the objective lens 1 to be inclined can be suppressed.

Furthermore, by mounting the magnets 8a and 8f first, which are diagonally positioned, it becomes possible to cause the central magnets 8b and 8e to be disposed line-symmetrically with respect to the x axis even when the widths Wmb and Wme of the central magnets 8b and 8e are smaller than the widths Wyb and Wye of the central yoke surfaces. In this case, while the magnetic flux density distribution has its center displaced from the x axis on each side of the lens holder 2, such displacement is symmetric with respect to the x axis. Thus, the angular moment generated through the focusing coil 3 and the tracking coils 4 about the x axis can be cancelled on each side of the lens holder 2.

If, as opposed to the aforementioned embodiment, the central magnets 8b and 8e are mounted while they are abutted against the magnets 8a and 8d (or 8c and 8f) on the same side in the tracking direction when the widths Wmb and Wme of the central magnets 8b and 8e are smaller than the widths Wyb and Wye of the central yoke surfaces, the magnetic flux density distribution on either side of the lens holder 2 would be displaced along the x axis towards the same side in the tracking direction. As a result, a difference would be caused between the focusing coils 3a and 3b in terms of the drive force generated, thereby resulting in the problem of generation of angular moment about the x axis.

Figure 4:
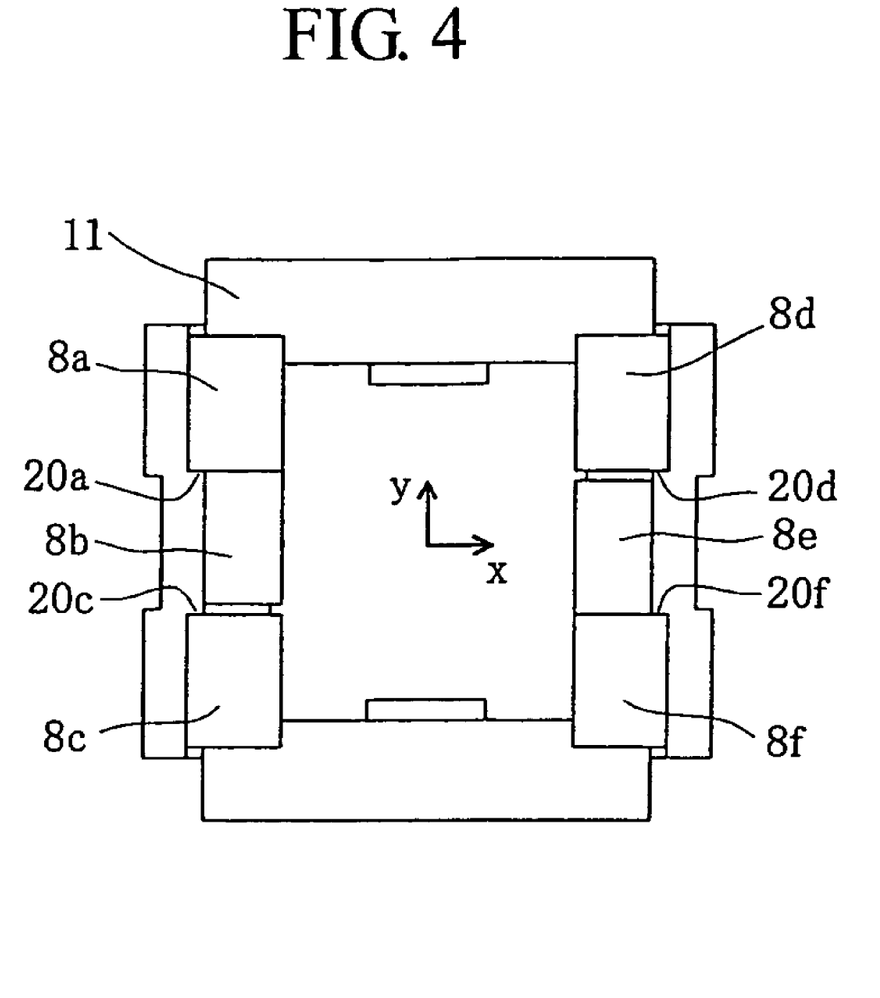
FIG. 4 shows the magnets of the objective lens driving means shown in FIG. 1 having different dimensions from those of FIG. 1.

In the present embodiment, even if there were dimensional error in any of the magnets, because the boundary positions between the individual magnets are fixed at the step surfaces 20a, 20c, 20d, and 20f, the symmetry of the magnetic flux density distribution can be maintained. For example, FIG. 4 shows a case where the width of each of the magnets in the tracking direction is narrower than a predetermined width. In this case, the positions of both ends of the outer magnets 8a, 8c, 8d, and 8f are different from the reference positions. However, because the magnetic flux density distribution on either side of the lens holder 2 is symmetric with respect to the x axis, the generation of angular moment through the focusing coil 3 and the tracking coil 4 about the x axis can be suppressed.

Figure 5:
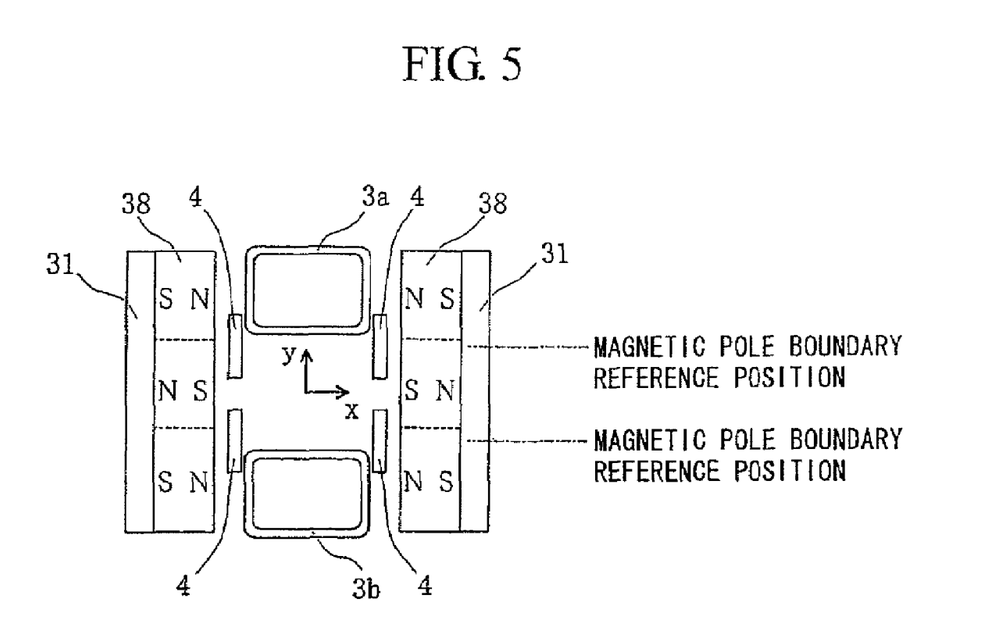
FIG. 5 shows an arrangement of a yoke and magnets of an objective lens driving means different from that of the invention.

When a magnet 38 having three magnetic pole regions is mounted on a plate-like yoke 31, as in a conventional example, the reference for mounting is provided by the outer shape of the yoke 31 and the magnet 38. However, as shown in FIG. 5, if there is manufacturing error in the magnetic pole boundary positions, the magnetic pole boundary positions would be displaced from their reference positions, and the magnetic flux density distribution on either side of the lens holder 2 would be displaced along the x axis toward the same side of the tracking direction. As a result, a difference would be caused between the focusing coils 3a and 3b in terms of the drive force generated by each, which would result in the problem of generation of angular moment about the x axis.

Figure 6:
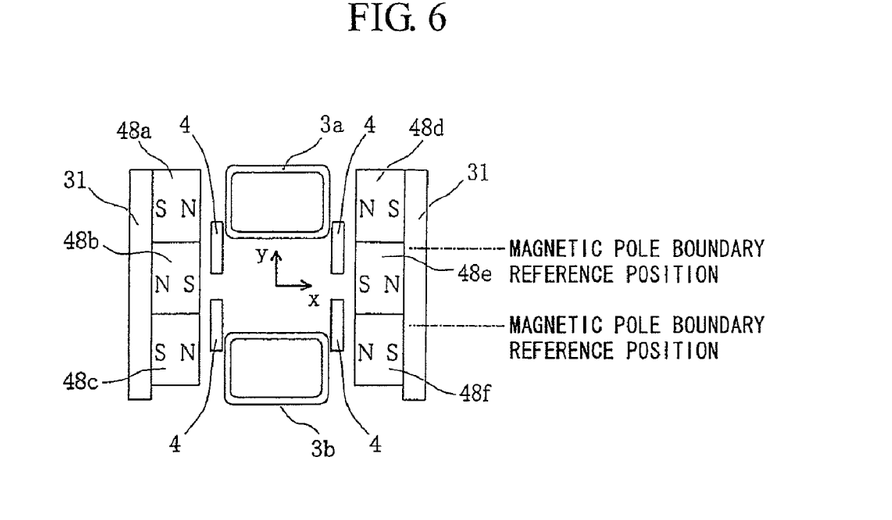
FIG. 6 shows an arrangement of a yoke and magnets of an objective lens driving means different from that of the invention.

Further, when magnets 48a to 48f are mounted three by three on each plate-like yoke 31 as in a conventional example, as shown in FIG. 6, if the dimensions of any of the magnets vary due to manufacturing error, the boundary positions of individual magnets could be displaced from reference positions, resulting in the problem of generation of angular moment about the x axis, as in the aforementioned example.

Thus, in accordance with the present invention, in an optical pickup configured such that a plurality of magnets are disposed adjacent to one another, even when there is dimensional error in any of the magnets, the accuracy of the boundary positions of the magnets can be improved. Thus, the magnetic flux density distribution can be maintained symmetrical, and the generation of angular moment that causes the objective lens to be tilted can be suppressed. Thus, the invention allows information to be written on or read from an optical disc accurately.

Furthermore, in the present embodiment, the thicknesses Tb and Te of the central magnets 8b and 8e are made smaller than the thicknesses Ta, Tc, Td, and Tf of the outer magnets 8a, 8c, 8d, and 8f by the height of the steps in the yoke 11. Therefore, the surfaces of the magnets 8a, 8b, and 8c facing to the lens holder 2 all lie in the substantially same plane, and so do the surfaces of the magnets 8d, 8e, and 8f facing to the lens holder 2. This ensures that the distance between each of the magnets and the focusing coil 3 or the tracking coil 4 is uniform. As a result, the drive force produced by the focusing coil 3 and the tracking coil 4 can be increased, so that the writing or reading of information on the optical disc can be preformed at high speed.

The invention can be applied to optical pickups in optical disc drives.

What is claimed is:

1. An optical pickup for reading and writing information on an optical disc using an objective lens, comprising:
a lens holder for holding an objective lens;
three magnets disposed facing to each of the two sides of the lens holder that are parallel to a focusing direction and a tracking direction; and
a yoke for mounting the magnets on each of the two sides of the lens holder, the yoke including a central yoke surface for mounting a central magnet of the three magnets and outer yoke surfaces for mounting the two outer magnets of the three magnets respectively, wherein a step is formed between the central yoke surface and each of the outer yoke surfaces and the outer magnets are disposed to be abutted against their steps of the yoke,
wherein the width of the central magnet in the tracking direction is equal to or smaller than the width of the central yoke surface of the yoke in the tracking direction, and wherein the central magnets are abutted against their respective outer magnets disposed on a diagonal with the objective lens in the center of their outer magnets.

2. The optical pickup according to claim 1, wherein the thickness of the central magnet is smaller than the thickness of the outer magnets, and wherein the surfaces of the three magnets facing to the side of the lens holder parallel to the focusing direction and the tracking direction lie substantially in the same plane.

* * * * *